United States Patent [19]

Nakase

[11] Patent Number: 4,557,460

[45] Date of Patent: Dec. 10, 1985

[54] SWIVEL BRACKET HOLDING MECHANISM FOR MARINE PROPULSION DEVICE

[75] Inventor: Ryoichi Nakase, Hamamatsu, Japan

[73] Assignee: Sanshin Kogyo Kabushiki Kaisha, Hamamatsu, Japan

[21] Appl. No.: 565,208

[22] Filed: Dec. 23, 1983

[30] Foreign Application Priority Data

Dec. 25, 1982 [JP] Japan ................................ 57-226536

[51] Int. Cl.$^4$ ................................................ F16M 1/00

[52] U.S. Cl. .................................... 248/642; 248/351; 440/900

[58] Field of Search ............... 248/642, 640, 641, 643, 248/351; 440/900

[56] References Cited

U.S. PATENT DOCUMENTS

| | | | |
|---|---|---|---|
| 3,666,218 | 5/1972 | Hagen | 248/642 |
| 3,785,329 | 1/1974 | Shimanckas . | |
| 4,177,747 | 12/1979 | Pichl | 248/642 X |
| 4,354,847 | 10/1982 | Blanchard | 440/900 X |
| 4,354,848 | 10/1982 | Hall et al. | 248/642 X |
| 4,367,860 | 1/1983 | Strang | 248/642 X |
| 4,395,238 | 7/1983 | Payne | 248/642 X |
| 4,402,675 | 9/1983 | Eichinger | 248/643 X |
| 4,403,969 | 9/1983 | Pichl | 248/642 X |
| 4,438,899 | 3/1984 | Perkins et al. | 248/642 |

*Primary Examiner*—Ramon S. Britts
*Assistant Examiner*—Ramon O. Ramirez
*Attorney, Agent, or Firm*—Ernest A. Beutler

[57] ABSTRACT

A reverse lock and tilt locking mechanism for an outboard drive embodying a simplified construction wherein a single operating handle controls both the reverse locking mechanism and the tilt locking mechanism. The construction is such that when the operating handle is moved to a position to release the reverse locking mechanism, the tilt locking mechanism can automatically engage when the outboard drive is tilted up.

8 Claims, 6 Drawing Figures

Fig-3
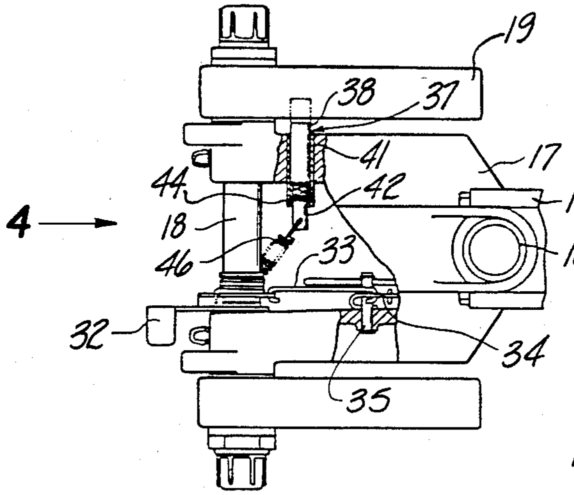
Fig-5
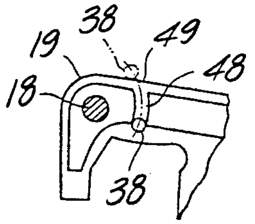
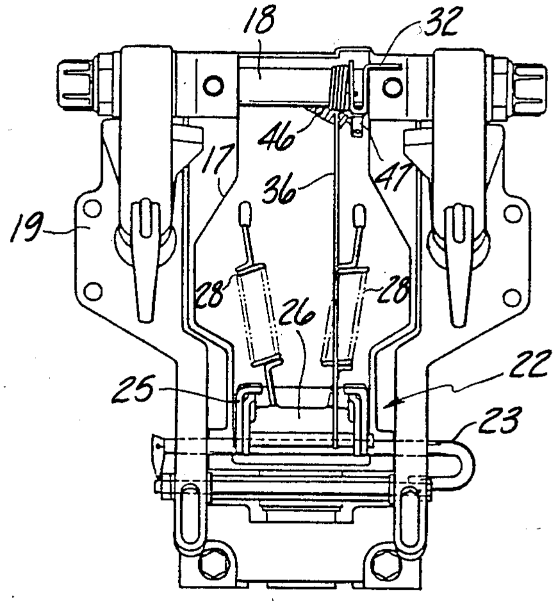
Fig-4
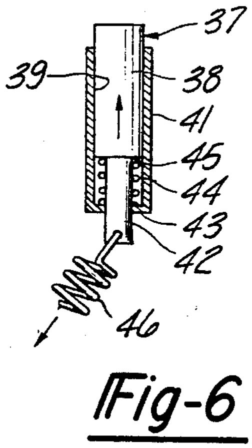
Fig-6

SWIVEL BRACKET HOLDING MECHANISM FOR MARINE PROPULSION DEVICE

BACKGROUND OF THE INVENTION

This invention relates to a swivel bracket holding mechanism for a marine propulsion device and more particularly to an improved, simplified tilt locking mechanism for an outboard drive.

Outboard drives such as an outboard motor or the outboard drive portion of an inboard-outboard drive are mounted for tiling movement about a generally horizontally extending tilt axis. The arrangement is such that the outboard drive may be tilted up so that its lower unit will be positioned out of the water. Some form of tilt locking mechanism is generally employed for locking the outboard drive in its tilted up position. The simplest of these tilt locking mechanisms require the operator to lift the outboard drive with one hand and, at the same time, operate the locking mechanism with his other hand so as to lock the outboard drive in its tilted up position. Such arrangements are obviously cumbersome, particularly when the outboard drive is heavy since the operator would prefer to be able to use both hands to lift the outboard drive.

Alternatively, arrangements have been provided in which the tilt locking mechanism may be prepositioned so that it will engage the outboard drive and lock it up in the tilted up position in response to the positioning of the motor in its tilted up position. Since the outboard drive also normally incorporates a reverse locking mechanism for holding the outboard drive against tilting up under reverse thrust, this reverse locking mechanism must also be released to permit the motor to be tilted up. Therefore, there are in some prior art arrangements devices that require the manipulation of several operating handles so as to permit an outboard drive to be tilted up and retained in its tilted up position. Although devices have been proposed for interrelating the tilt locking mechanism with the reverse lock, such devices have been very cumbersome, have required considerable linkage and also are at times awkward to operate.

It is, therefore, a principal object of this invention to provide an improved and simplified tilt locking mechanism.

It is a further object of this invention to provide a tilt locking mechanism that is interrelated with the reverse lock so as to provide a simple and yet highly effective arrangement.

It is a still further object of this invention to provide a reverse lock and tilt locking mechanism for an outboard drive that may be operated by a single handle and utilizing a minimum of linkage and interconnecting elements.

SUMMARY OF THE INVENTION

This invention is adapted to be embodied in a tilt locking arrangement for a marine outboard drive that is adapted to be mounted on a transom or the like of a watercraft for pivotal movement about a generally horizontally extending axis from a normal, tilted down running position to a tilted up, out of the water position. Reverse locking means are provided that are movable from a released position to an engaged position for retaining the outboard drive in its tilted down position in opposition to reverse thrust. An operating handle movable from a locked position to a released position is coupled to the reverse locking means for moving the reverse locking means between its engaged position and its released position in response to movement of the operating handle between its locked position and its released position. In accordance with the invention, a tilt locking element movable between a released position and an engaged position is provided. The tilt locking element is operative when in its engaged position to lock the outboard drive in its tilted up position. Means interrelate the tilt locking element and the operating handle for retaining the tilt locking element in its released position when the operating handle is in its locked position and for movement of the tilt locking element to its engaged position upon placement of the operating handle in its released position and upon movement of the outboard drive to its tilted up position.

BRIEF DESCRIPTION OF THE DRAWINGS

FIG. 3 is a top plan view looking generally in the direction of the arrow 3 in FIG. 2 and with a portion broken away to more clearly show the construction.

FIG. 4 is a front elevational view looking in the direction of the arrow 4 in FIG. 3.

FIG. 5 is an view showing the construction of the tilt locking mechanism.

FIG. 6 is an enlarged, cross-sectional view taken through a portion of the tilt locking mechanism.

DETAILED DESCRIPTION OF THE PREFERRED EMBODIMENT

Figure 2:
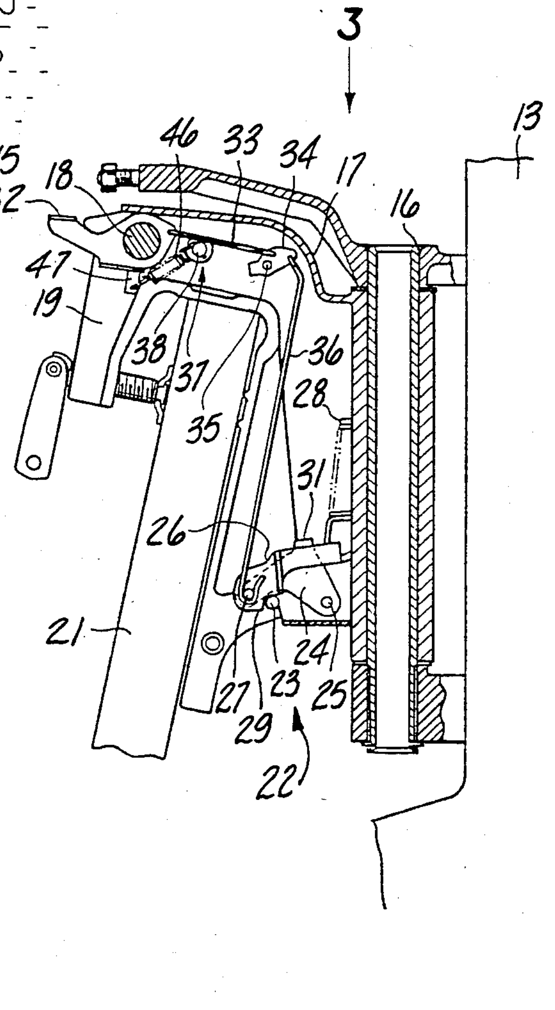
FIG. 2 is an enlarged, cross-sectional view of the tilt locking arrangement, with portions shown in cross-section.

Referring first to FIG. 2, an outboard motor constructed in accordance with this invention is identified generally by the reference numeral 11. Although the invention is described in conjunction with an outboard motor, it is to be understood that it may be equally as well practiced with the outboard drive of an inboard-outboard unit. The application of the invention to such an outboard drive is believed to be clear to those skilled in the art based upon the following description of the application of this device to the outboard motor 11.

The outboard motor 11 includes a power head 12 in which a suitable internal combustion engine is positioned, a drive shaft housing 13 through which a drive shaft driven by the motor of the power head 12 extends and is supported and a lower unit 14. A propeller 15 is journalled in the lower unit 14 and is driven from the drive shaft in any suitable manner which may include a forward reverse transmission.

A steering shaft 16 (FIGS. 2 and 3) is affixed to the drive shaft housing 13 and is journalled for steering movement about a generally vertically extending axis in a swivel bracket 17. The swivel bracket 17 is, in turn, supported for tilting movement about a horizontally extending axis by means of a tilt pin 18, which is journalled in a clamping bracket assembly 19. The clamping bracket assembly 19 is, in turn, adapted to be affixed to a transom 21 of an associated watercraft in a known manner. The construction thus far described may be considered to be conventional and, for that reason, has not been described in great detail.

A reverse locking mechanism, indicated generally by the reference numeral 22, is provided for holding the outboard motor 11 in an adjusted trim condition and against movement in a tilting up direction when operating in reverse gear. As is well known with this type of mechanism, the reverse locking mechanism 22 is designed so as to release if the lower unit 14 strikes a submerged obstacle with sufficient force to permit it to pop up and prevent damage. As is also typical with these devices, the reverse lock mechanism 22 will reengage when the motor 11 returns down under its own weight when the underwater obstacle has been cleared.

The reverse locking mechanism 22 includes a reverse locking pin 23 that is adapted to be received in selected, aligned apertures in the clamping bracket 19 so as to permit adjustment of the trim position of the motor 11. Reverse locking mechanism 22 further includes a reverse locking lever 24 that is pivotally supported on the swivel bracket 17 by means of a pivot pin 25. A second lever 26 is pivotally supported at the forward end of the locking lever 24 by means of a pivot pin 27. The rear end of the second lever 26 is engaged by one end of each of a pair of tension springs 28, the other end of which is affixed to the swivel bracket 17 for exerting a force on the reverse locking mechanism in a direction to be described. The second lever 26 has a hooked end portion 29 that is adapted to coact with the reverse locking pin 23 so as to retain the motor 11 against popping up.

The locking lever 24 has a tang or tangs 31 that are engaged with the upper side of the lever 26 so that the lever 24 will be pivoted along with the lever 26 about the pivot pin 25 when the reverse locking mechanism 22 is released, in a manner to be described.

Control of the reverse locking mechanism 22 is afforded by means of an operating lever 32 that is journaled upon the tilt pin 18 and which is positioned so as to be readily accessible to the operator of the motor 11. One end of a link 33 is pivotally connected to the operating lever 32. The opposite end of the link 33 is pivotally connected to a second link 34 that is mounted for pivotal movement on a pivot pin 35 which is, in turn, affixed to the swivel bracket 17. A second link 36 is pivotally connected at one of its ends to the lever 34 and at its other end to the pin 27.

FIG. 2 shows the reverse locking mechanism 22 in its locked position. In the event the outboard motor 11 is being operated in a reverse mode, the interengagement between the hook portion 29 of the lever 26 and the pin 23 will hold the motor 11 against popping up. If, however, the motor 11 is being operated so as to drive the watercraft in a forward direction and the lower unit 14 strikes a submerged obstacle with sufficient force, the lever 26 will pivot free of its engagement with the pin 23 thus tensioning the spring 28 and permitting the motor 11 to pop up. Once the obstacle is cleared, the forward portion of the hook like part 29 of the lever 26 will engage the pin 23 and cause it to cam back to the locked position as shown in FIG. 2.

If it is desired to release the tilt locking mechanism 22 so that the motor 11 may be manually tilted up, the operating handle 32 is rotated in a counterclockwise direction as shown in FIG. 2 from its locked position to an unlocked position. It should be noted that the operation of the springs 28 is such so as to hold the operating lever 32 in its locked position. When the lever 32 is rotated in a clockwise direction to its unlocked position, a tension will be placed on the link 33 that rotates the lever 34 in a counterclockwise direction. Thus, the link 36 will be drawn upwardly and the levers 26 and 24 will rotate in a clockwise direction about the pin 25 so that the lever hook portion 129 is clear of the reverse locking pin 23. When this occurs, the levers 26 and 24 go to an over center condition so that the springs 28 will now exert a force through the levers on to the operating handle 32 so as to retain it in its unlocked condition. The motor 11 may then be tilted up by the operator.

Return of the operating lever 32 to its locked condition is achieved by rotating it in a clockwise direction and the operation of the remaining portion of this mechanism during return locking is believed to be readily apparent from the foregoing description.

In addition to the reverse locking mechanism 22, a tilt locking mechanism, indicated generally by the reference numeral 37 and shown in most detail in FIGS. 2, 3, 5 and 6, is provided. The tilt locking mechanism 37 includes a tilt locking pin having a large diameter cylindrical portion 38 that is slidably supported within a bore 39 of a anti-friction bushing 41 which is, in turn, supported in the swivel bracket 17 so that the pin 38 will reciprocate along an axis that is parallel to the axis of the tilt pin 18 (the tilting axis of the motor 11).

The tilt locking pin further has a smaller diameter cylindrical portion 42 that extends through an opening formed in a wall 43 of the bushing 41 at the base of the bore 39. A coil compression spring 44 is received within this area and engages a shoulder 45 formed between the cylindrical portions 38 and 42 and the wall 43 so as to normally urge the tilt locking pin to an engaged position. A coil tension spring 46 has one of its ends affixed to the projecting portion 42 of the tilt locking pin. The opposite end of the spring 46 is engaged with a tang 47 that is formed integrally with the reverse locking lever 32.

Figure 1:
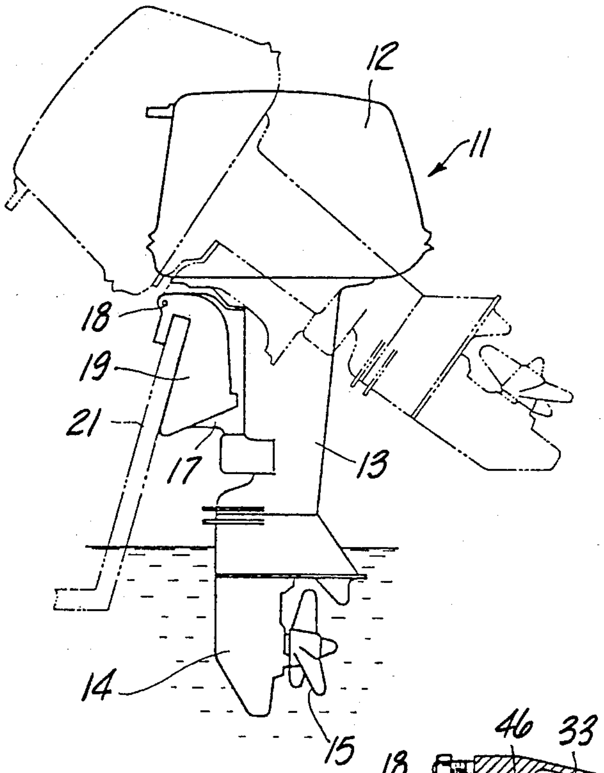
FIG. 1 is a side elevational view of an outboard motor having a tilt locking mechanism constructed in accordance with an embodiment of the invention. The motor is shown in a tilted down position in solid lines and in a tilted up position in phantom lines.

FIGS. 2, 3, 5 and 6 show the tilt locking mechanism in its released position. When in this position, the tension of the spring 46 is greater than the force of the compression spring 44 so that the tilt locking pin will be held in a released position. However, when the reverse locking lever 32 is rotated in the counterclockwise direction so as to release the reverse locking mechanism 22 in the manner previously described, the tension on the spring 46 will be substantially reduced. The compression spring 44 will then immediately urge the tilt locking lever in an axial direction into engagement with a cam surface 48 formed on the contiguous portion of the clamping bracket 19 (FIG. 5). The surface 48 is arcuate and is concentric with the axis of the tilt pin 18. Thus, when the motor 11 is tilted up after the reverse lock 22 has been released, the tilt locking pin will follow the surface 38 until the motor is tilted up sufficiently so that the tilt locking pin can enter above a surface 49 of the clamping bracket 19. Release of the motor 11, by an operator who has tilted it up, will cause engagement of the tilt locking pin with the surface 49 and will hold the motor 11 in the tilted up position as shown in the phantom line view of FIG. 1.

When it is desired to release the tilt locking mechanism 37 so as to permit the motor 11 to be tilted down, the operating lever 32 is rotated back from its released position to its engaged position. As has been previously noted, the springs 28 hold the lever 32 in both its released and engaged positions. When the operating lever 32 is rotated back to its engaged position, the spring 46 is again tensioned sufficiently so as to overcome the action of the compression spring 44 and the tilt locking pin will be withdrawn from engagement with the surface 49 of the clamping bracket 19. The motor 11 may then be lowered without the operator having to hold the lever 32. When the motor 11 reaches the set trim condition, the reverse locking mechanism 22 will reengage and the motor will be held in this position as afore-noted.

It should be readily apparent from the foregoing description that a relatively simple and yet highly effective mechanism has been provided for interrelating the tilt locking mechanism with the reverse locking mechanism so that the motor 11 may be tilted and locked up without the necessity of the operator using one of his hands to operate the lever 32 at the same time he is lifting the motor 11. In a like manner, the motor 11 may be lowered without the operator needing to use one hand to hold the lever 32 in its locked position. In addition, the mechanism which interrelates the elements is extremely simple and foolproof. Furthermore, the operating lever 32 is disposed in proximity to the operator and is retained in both of its positions through a simple and yet highly effective mechanism.

Although an embodiment of the invention has been illustrated and described, various changes and modifications may be made without departing from the spirit and scope of the invention, as defined by the appended claims.

I claim:

1. In a tilt locking arrangement for a marine outboard drive adapted to be mounted on a transom or the like of a watercraft for pivotal movement about a generally horizontally extending axis from a normal, tilted down running position to a tilted up, out of the water position, reverse locking means movable from a released position to an engaged position for retaining said outboard drive in its tilted down position in opposition to reverse thrust, an operating handle movable from a locked position to a released position, and means for coupling said operating handle to said reverse locking means for moving said reverse locking means between its engaged position and its released position in response to movement of said operating handle between its locked position and its released position, the improvement comprising a tilt locking element movable between a released position and an engaged position, said tilt locking element being operable when in its engaged position to lock said outboard drive in its tilted up position, and means for interrelating said tilt locking element with said operating handle for retaining said tilt locking element in its released position when said operating handle is in its locked position and for movement of said tilt locking element to its engaged position upon the placement of said operating handle in its released position and upon the movement of said outboard drive to its tilted up position.

2. In a tilt locking arrangement as set forth in claim 1 further including biasing means operative to retain said operating handle in each of its positions.

3. In a tilt locking arrangement as set forth in claim 2 wherein the biasing means precludes the operating handle from being retained in a position intermediate its two positions.

4. In a tilt locking arrangement as set forth in claim 1 further including biasing means for urging said tilt locking element to its engaged position when said operating handle is in its released position and for urging said tilt locking element to its released position when said operating handle is in its engaged position.

5. In a tilt locking arrangement as set forth in claim 4 wherein the biasing means includes first spring means constantly urging said tilt locking element to one of its positions.

6. In a tilt locking arrangement as set forth in claim 5 wherein the biasing means further includes a second spring means having a varying tension for urging the tilt locking element to the other of its positions.

7. In a tilt locking arrangement as set forth in claim 6 wherein the first spring means biases the tilt locking element to its engaged position and the second spring means is operatively coupled to the operating handle for varying the tension on said second spring means in response to the position of said operating handle.

8. In a tilt locking arrangement as set forth in claim 7 wherein the tilt locking element is juxtaposed to a cam surface for retaining said tilt locking element in a position between its released position and its engaged position and which cam surface terminates when said outboard drive is in its tilted up position for permitting movement of said tilt locking element to its engaged position.

* * * * *